United States Patent [19] [11] 4,029,577
Godlewski et al. [45] June 14, 1977

[54] POLYMERS FOR USE IN WATER TREATMENT
[75] Inventors: Irene T. Godlewski, Moorestown, N.J.; Joseph J. Schuck, Holland; Bruce L. Libutti, Bethayres, both of Pa.
[73] Assignee: Betz Laboratories, Inc., Trevose, Pa.
[22] Filed: Nov. 17, 1975
[21] Appl. No.: 632,549
[52] U.S. Cl. .................................. 210/58; 252/180
[51] Int. Cl.² ........................................... C02B 5/06
[58] Field of Search .............. 210/58; 252/180, 181
[56] References Cited
UNITED STATES PATENTS

| | | | |
|---|---|---|---|
| 3,463,730 | 8/1969 | Booth | 210/58 |
| 3,663,448 | 5/1972 | Ralston | 210/58 |
| 3,790,610 | 2/1974 | Lum et al. | 210/58 |
| 3,880,765 | 4/1975 | Watson | 210/58 |

Primary Examiner—Thomas G. Wyse
Attorney, Agent, or Firm—Alexander D. Ricci; Steven H. Markowitz

[57] ABSTRACT

The present invention relates to processes for controlling the formation and deposition of scale and/or suspended solid matter which otherwise would occur in aqueous mediums containing scale imparting ions and dispersed particles. The invention, more particularly, relates to the control of the formation of, the reduction and/or the prevention of the deposition of calcium phosphate, magnesium silicate and/or iron oxide, clay and mixtures thereof in cooling water, scrubber and steam generating systems, evaporators, economisers and the like by the introduction of an effective amount for the purpose of a water soluble polymer composed primarily of moieties derived from acrylic acid or water soluble salt thereof and hydroxy lower alkyl acrylate moieties or water soluble salt thereof to the water used therein. The polymers discovered to be effective for the purpose are those preferably having a mole ratio of from about 34 : 1 to about 1 : 4 of acrylic acid to hydroxylated lower alkyl acrylate moieties. The lower alkyl is an alkyl of from 2 to 6 carbon atoms.

27 Claims, No Drawings

POLYMERS FOR USE IN WATER TREATMENT

BACKGROUND OF THE INVENTION

Although the invention has general applicability to any given system where the formation and deposition of calcium phosphate is a potential problem, the invention will be discussed in detail as it concerns cooling water and boiler water systems.

The term "cooling water" is applied wherever water is circulated through equipment to absorb and carry away heat. This definition includes air conditioning systems, engine jacket systems, refrigeration systems as well as the multitude of industrial heat exchange operations, such as found in oil refineries, chemical plants, steel mills, etc.

The once-through system, as the name implies, is one in which the water is passed through the heat exchange equipment and the cooling water is then discharged to waste. Usually, a once-through system is employed only where water at suitably low temperature is readily available in large volume and at low cost. The usual source of one-through cooling water is from wells, rivers and lakes where the cost involved is that of pumping only. In a once-through system, no evaporation takes place and consequently the water does not concentrate. Circulating water characteristics are the same as the makeup water.

The use of a recirculating system, in which a cooling tower, spray pond, evaporative condenser and the like serve to dissipate heat, permits great economy in makeup water requirements. With dwindling supplies of fresh cold water available for industry's cooling requirements, increased use must be made of recirculating systems in which the cooling water is used over and over again. p After passage of the circulating water through the heat exchange equipment, the water is cooled in passing over the cooling tower. This cooling effect is produced by evaporation of a portion of the circulating water in passing over the tower. By virtue of the evaporation which takes place in cooling, the dissolved solids and suspended solids in the water become concentrated.

The circulating water becomes more concentrated than the makeup water due to this evaporation loss. Cycles of concentration is the term employed to indicate the degree of concentration of the circulating water as compared with the makeup. For example, 2.0 cycles of concentration indicates the circulating water is twice the concentration of the makeup water.

Deposits in lines, heat exchange equipment, etc., may originate from several causes. For example, the precipitation of calcium carbonate and calcium phosphate will form scale, but products of corrosion also result in a deposite of iron oxide. In speaking of deposits which form in cooling water systems, it is important to bear in mind the mechanism causing the deposit, otherwise confusion may result. In general, the term "scale" applies to deposits which result from crystallization or precipitation of salts from solution. Wasting away of a metal is the result of corrosion. While a deposit results in both cases, the mechanism of formation is different and different corrective methods are required to prevent the deposit.

Some of the factors which affect scale formation are temperature, rate of heat transfer, the calcium, sulfate, magnesium, silica, phosphate, alkalinity, dissolved solids and pH of the water.

In the past in order to minimize the formation of the scale forming salts, the cooling water systems were operated at pH's where the solubility of the "hardness" or "scale forming" ions were the greatest. Because the pH's of the systems were acidic, corrosion inhibitors together with dispersants were the normal treatment. Corrosion inhibition in most instances required chromate treatment. With the advent of tight controls as regards toxic pollutant discharge, operating parameters of cooling water systems had to be changed in an attempt to utilize nonchromate treatment. The development of high pH and/or non-chromate corrosion programs over the past few years has concurrently enhanced the potential for heat exchange fouling due to chemical precipitation. Since most of the treatments currently used include phosphate and/or phosphonic acid compounds, such as the alkali metal polyphosphates, organo-phosphates, e.g., phosphate esters, etc., amino-trimethylene phosphonic acid, hydroxy ethylidene diphosphonic acid, and the water soluble salts thereof and since there may be phosphate in the makeup water supply for example tertiary sewage treatment effluent for makeup water, calcium phosphate scaling has become one of the major problems encountered. The reversion of the polyphosphates and the organic phosphates plus the use of alkaline operating conditions leads to the formation and deposition of the highly insoluble calcium phosphate.

Although steam generating systems are somewhat different from cooling water systems, they share a common problem as relates for example to calcium phosphate and iron oxide formation and deposition.

As detailed in the *Betz Handbook of Industrial Water Conditioning*, Sixth Edition, 1968, Betz Laboratories, Inc., Trevose, Pa., pages 151–171, the formation of scale and sludge deposits on boiler heating surfaces is the most serious water problem encountered in steam generation. Although current industrial steam producing systems make use of sophisticated external treatments of the boiler feed water, e.g., coagulation, filtration, softening of water prior to its feed into the boiler system, those operations are only moderately effective. In all cases, external treatment does not in itself provide adequate treatment since muds, sludge, silts and hardness-imparting ions escape the treatment, and eventually are introduced into the steam generating system.

The problems which result from their introduction into the steam generating system are apparent. Since the deposit forming materials are present, they have a tendency to accumulate upon concentration of the water and to settle at points in the system where there is low flow and therefore to restrict water circulation. The baking of mud and/or sludge on tubes and sheets will result in overheating and failure, thereby requiring down time for repair or replacement of the structural parts. In addition, mud, sludge and silts may become incorporated in scale deposits adding to their volume and heat insulating effect.

Accordingly, internal treatments have been necessary to maintain the mud and silts in a suspended state. These internal treatments have been generally referred to in the industry as sludge conditioning agents.

In addition to the problems caused by mud, sludge or silts, the industry has also had to content with boiler scale. Although external treatment is utilized specifically in an attempt to remove calcium and magnesium from the feed water, scale formation due to residual hardness, i.e., calcium and magnesium salts, is always experienced. Accordingly, internal treatment, i.e., treatment of the water fed to the system, is necessary to prevent, reduce and/or retard formation of the scale-imparting compounds and their deposition. The carbonates of magnesium and calcium are not the only problem compounds as regards scale, but also waters having high contents of phosphate, sulfate and silicate ions either occurring naturally or added for other purposes are problematic since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

Although the foregoing is directed for the most part to cooling water systems and boiler water systems, or more specifically steam generating systems, the same problems occur in scrubber systems and the like. Any aqueous system having calcium and magnesium cations and the exemplified anions, in particular phosphate, will experience the formation and deposition of the scaling salts.

Because of the foregoing, the water treatment industry is constantly evaluating new processes, new products, new techniques in an effort to permit the various process water systems to operate more effectively for longer periods and at lower costs.

Many and different type materials have been used for the treatment of water systems. Of the vast number may be mentioned alginates, lignins, lignosulfonates, tannins, carboxymethyl cellulose materials, and synthetic polymers such as polyacrylates and polymethacrylates.

GENERAL DESCRIPTION OF THE INVENTION

The inventors discovered that if a particular type water soluble polymer composed essentially of moieties derived from acrylic acid or derivatives thereof and hydroxylated lower alkyl acrylate moieties was added or introduced in an effective amount for the purpose into the water of a process water system, the formation and deposition of scale, particularly calcium and magnesium phosphates and silicate scales, and the deposition of suspended matter such as iron oxide, clay and mixtures thereof on the metallic structures of the equipment could be controlled to a degree necessary to permit the continued and economical operation of the system.

The polymers which are the subject of the present invention are those containing essentially moieties derived from an acrylic acid compound, i.e.,

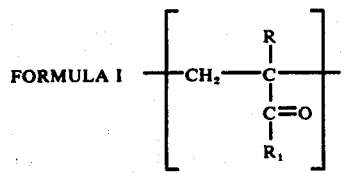

FORMULA I where R is hydrogen or a lower alkyl of from 1 to 3 carbon atoms and $R_1$ = OH, OM, $NH_2$, where M is a water soluble cation, e.g., $NH_4$, alkali metal (K, Na), etc.; and moieties of an hydroxylated lower alkyl ($C_2$–$C_6$) acrylate as represented for example by the formula

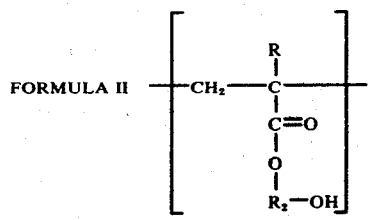

FORMULA II where R is H, or $CH_3$, and $R_2$ is a lower alkyl having from about 2 to 6 carbon atoms.

The polymers most advantageously have a mole ratio of moieties derived from an acrylic acid compound (FORMULA I) to hydroxy alkyl acrylate derived moieties of from about 34 : 1 to about 1 : 4, and preferably 11 : 1 to 1 : 2, and possess a molecular weight of from 500 to 1,000,000 and preferably 1,000 to 5000,000. The only criteria that is of importance that applies to the mole ratios of the described monomers is that it is desirable to have a copolymer which is soluble in water. As the proportion of hydroxylated alkyl acrylate moieties increases, the solubility of the copolymer decreases.

The polymers should be added to the aqueous system to be treated in an amount effective for the purpose, taking into consideration the respective concentrations in the water of the potential scale and deposit formers, the pH of the water and the chemical and physical properties of the polymer. The criteria for proper treatment of any aqueous system would be apparent to the worker in the art of water treatment. For the most part the polymers will be effective when used at levels of from about 0.1 to 500 parts per million of water, and preferably from about 2.5 to 100 parts per million parts of water contained in the aqueous system to be treated.

The polymers utilized in accordance with the invention can be prepared by vinyl addition polymerization or by treatment of an acrylic acid or salt polymer. More specifically, acrylic acid or derivatives thereof or their water soluble salts, e.g., sodium, potassium, ammonium, etc. can be copolymerized with the hydroxy alkyl acrylate under standard copolymerization conditioning utilizing free radicals such as benzoyl peroxide, azobisisobutyronitrile or redox initiators such as ferrous sulfate and ammonium persulfate. The molecular weights of the resulting copolymer can be controlled utilizing standard chain control agents such as secondary alcohols (isopropanol), mercaptans, halocarbons, etc. Copolymers falling within the scope of the invention are commercially available from, for example, National Starch Company.

The hydroxy alkyl acrylate can be prepared by the addition reaction between the acrylic acid or its derivatives or water soluble salts and the oxide of the alkyl derivative desired. For example, the preferred monomer of the present invention is the propyl derivative. Accordingly, to obtain the hydroxylated monomer, acrylic acid is reacted with propylene oxide to provide the hydroxy propyl acrylate monomer.

The polymers of the invention may also be prepared by reacting a polyacrylic acid or derivatives thereof with an appropriate amount of an alkylene oxide having from 2 to 6 carbon atoms such as ethylene oxide, propylene oxide and the like. The reaction takes place at the COOH or COM group of the moieties to provide the hydroxylated alkyl acrylate moiety.

The polymer prepared either by copolymerization or by reaction of a polyacrylic acid or acrylate with the propylene oxide would be composed of units or moieties having the structural formulas

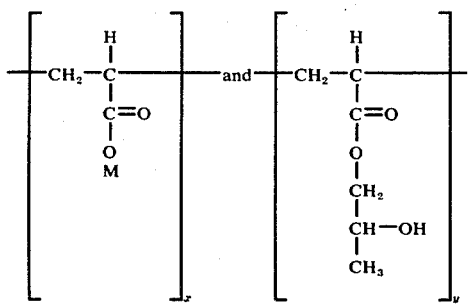

where M is as earlier defined and where the mole ratio of x:y is preferably 11 : 1 to 1 : 2. The polymer preferably has a molecular weight of from 1,000 to 500,000.

SPECIFIC EMBODIMENTS

Atmospheric Pressure Screening Test

In order to determine whether a material has applicability as a calcium phosphate deposit control agent, the material is prescreened utilizing the test procedure hereafter described.

As may be apparent to the artisan, although steam generating systems and cooling water systems have common problems as relates to calcium phosphate, the specific problems are somewhat different. In steam generation the precipitate of calcium phosphate actually forms, and therefore must be dealt with. Usually it is kept dispersed so as not to deposit in the metal structures. In cooling water systems, the desire is to first control and if possible prevent the formation of calcium phosphate, and then, if it indeed forms, to control particle growth and its deposition. Accordingly, these aspects should be kept in mind in reviewing the tests and data which follow. Certain commercial grade polymers were also concurrently screened to evaluate differences. Comparisons for the most part were not technically proper because of the differences in molecular weight.

The basic screening apparatus, also known as the APU (Atmospheric Pressure Unit), is a once-through system consisting of a 1000 ml stainless steel reaction kettle with cover, a heater probe, a pump, two condensers and two feedtanks. One feedtank contains the cations (hardness ions, Ca/Mg, 100 ppm/100 ppm as $CaCO_3$) while the other feedtank contains the anions needed for hardness precipitation, required residuals, and programmed alkalinity levels. This latter feedtank also contains treatment when specified. For example, this feedtank can contain: $PO_4$ (phosphate); $CO_3$ (carbonate); OH (hydroxide); $SiO_3$ (silicate); treatment (polymer, copolymer, etc.).

There is a programmed flow of 5 ml/min. and a test duration of 2 days. Steam is generated by the use of a 1000 watt probe with a heat transfer of 133,000 BTU/$ft^2$/hr and condensate is returned by the condensers.

On Day 1 and Day 2 the solution is sampled for alkalinity, pH, residual silica and residual phosphate. At test completion, the scale on the probe is chemically dissolved and the solution analyzed for calcium, phosphate, magnesium, and silica. From these results a deposit weight in gms/$ft^2$ of heat transfer surface is calculated. Treatments are judged by their ability to reduce the amount of scale formed on the high heat transfer surfaces of the probes.

TABLE I

Atmospheric Pressure Screening Test for Acrylic Acid (AA) 2-Hydroxy Propyl Acrylate (HPA) Copolymer

| Polymer Treatment | Mole ratio AA to HPA | Nominal Molecular weight | Scale weight at K (g/$ft^2$) K=1 | K=5 |
|---|---|---|---|---|
| Control | — | — | 6.0 | 4.5 |
| AA/HPA | 2:1 | 6,000 | 1.5 | 0.9 |
| AA/HPA | 2:1 | 9.000 | 1.5 | 1.0 |
| AA/HPA | 3:1 | 10,000 | 1.8 | 1.0 |
| AA/HPA | 3:1 | 60,000 | 3.2 | 1.3 |
| AA/HPA | 3:1 | 150,000 | 3.2 | 0.8 |
| PAA* - commercial | — | less than 5,000 | 1.7 | 1.0 |
| PAA* - commercial | — | 20,000 | 5.0 | 2.2 |
| PAA* - commercial | — | 100,000 | 5.5 | 1.5 |
| PMA** - commercial | — | 7,000 | 2.5 | 1.3 |

K = ppm P-alkalinity × ppm residual silica ÷ 1,000
*PAA - polyacrylic acid
** PMA - polymethacrylate It was evident from the foregoing that the polymers of the instant invention performed quite satisfactorily.

Steam Generation

The polymers of the invention were subjected to steam generating conditions utilizing experimental boiler systems having an electrical heat source. The boilers are equipped with a system permitting circulation of water in a path via natural convection. Two probes are installed in the described path positioned vertically one above the other. These probes permit measurement of deposition, if any, at two different locations in the path through which the water is circulated. These probes are referred to in the following Tables as the Upper and Lower probes.

The tests conducted using the experimental boilers were operated under the conditions specified in the Tables which follow. The respective tests were designed to establish the effects, if any, of variations found in the different steam generating operations.

During operation of the boilers, pressure and heat probe amperage were continually monitored and the blowdown volumes and steam generation rates were measured.

After test completion, the heat transfer probes were removed and visual observations were recorded as to deposit color, quantity, and quality. Chemical analyses were employed to determine total deposit quantity. The deposit was dissolved in hydrochloric acid and hydrofluoric acid and the solution was analyzed for calcium, magnesium, phosphate and silica, since the test program was designed to valuate this type deposit. Deposit weight was calculated from the solution composition in volume and these results have been reported in the Tables which follow.

TABLE II

Boiler Evaluation of Sodium Acrylate - 2-Hydroxylated Propyl Acrylate Copolymer

| Polymer Treatment | Ratio Acrylic Acid to Hydroxylated Propyl Acrylate | Molecular Weight | Treatment conc. (ppm) | Boiler Balances (ppm) P Alk | RSiO$_2$ | Deposit (g/ft$^2$) Upper | Lower | Total |
|---|---|---|---|---|---|---|---|---|
| CONTROL | | — | — | 216 | 20 | 7.12 | 8.25 | 15.37 |
| | A. * Effect of Boiler Balances | | | | | | | |
| AA/HPA | 3:1 | 10,000 | 10 | 202 | 19 | 0.52 | 1.39 | 1.91 |
| AA/HPA | 3:1 | 10,000 | 10 | 222 | 22 | 0.88 | 1.19 | 2.07 |
| AA/HPA | 3:1 | 10,000 | 10 | 216 | 50 | 0.20 | 0.36 | 0.56 |
| AA/HPA | 2:1 | 6,000 | 10 | 182 | 29 | 0.31 | 0.59 | 0.90 |
| | B. * Effect of Dosage | | | | | | | |
| AA/HPA | 3:1 | 10,000 | 20 | 194 | 28 | 0.75 | 0.76 | 1.51 |
| AA/HPA | 3:1 | 10,000 | 10 | 202 | 19 | 0.52 | 1.39 | 1.91 |
| AA/HPA | 3:1 | 10,000 | 5 | 196 | 19 | 2.10 | 4.85 | 6.95 |
| | C. ** Effect of Heat Flux at 300 psig | | | | | | | |
| CONTROL | | — | — | 193 | 17 | 2.05 | 2.40 | 4.45 |
| AA/HPA | 3:1 *** | 10,000 | 10 | 205 | 16 | 0.45 | 0.49 | 0.94 |
| | D. ** Effect of Heat Flux at 900 psig (16 lbs/hr) | | | | | | | |
| CONTROL | | — | — | 202 | 23 | 2.72 | 3.14 | 5.86 |
| AA/HPA | 3:1 | 10,000 | 10 | 193 | 22 | 1.58 | 1.64 | 3.22 |
| AA/HPA | 3:1*** | 10,000 | 10 | 213 | 23 | 1.98 | 1.97 | 3.95 |

Test Conditions: Pressure: 300 psig except as noted
Heat Flux: 185,000 BTU/ft$^2$/hr except as noted
Residual Phosphate: 20 ppm
Feedwater Hardness: 15 ppm as CaCO$_3$ (10Ca/5Mg)
Cycles: 15
Steam Rate: 30 psig - 8 lbs/hr \* Boiler No. 2
\*\* Boiler No. 5
\*\*\* Heat Flux - 300,000 BTU/ft$^2$/hr It is apparent from the data recorded in the foregoing Table that the polymers of the invention provided the necessary effectiveness in steam generating systems.

In order to assess whether the polymers of the invention were as effective as deposit control agents as some of the polymers which have found general use in the treatment of the waters of steam generating systems, comparisons were conducted. In order for the comparisons to be of any substance, the molecular weight of the respective polymers used as treatment had to be at least in the same comparable range. In addition, the boiler operating conditions as regards the total P-alkalinity and Silica content of the water had to be maintained in the general area. It was felt that with these variables restricted to within acceptable degrees the comparisons would provide the necessary information. Commercial grade comparative polymers were utilized; therefore, the molecular weights were not equivalent to those polymers of the invention. However, the deviation was not felt to be large enough to provide unusual variations. Table III provides the data determined for the comparison.

dures were utilized, excepting that the boiler feed water was charged with water soluble iron salts. The test conditions were as follows:

| | |
|---|---|
| Pressure | 1450 psig |
| Heat Flux | 300,000 BTU/ft$^2$/hr |
| Steam Rate | 16 lbs/hr |
| Feed water iron concentration | 3.2 ppm Fe or Iron |
| Treatment Program | coordinated pH/PO$_4$ |
| Polymer Used | AA/HPA (3:1) - 10,000 m.w. |
| Polymer Concentration | 20 ppm in boiler |
| Cycles | 15 |
| Residual PO$_4$ | 20 ppm in boiler |

Result: It was established that the polymer of the invention provided 70 – 80% reduction in iron deposition, which, for practical purposes, is considered to be quite effective.

General Aqueous Systems

In order to establish that the present invention provided overall effectiveness, various evaluations were conducted which assimilated water conditions found in

TABLE III

Boiler Evaluation of Various Polymer Treatments at 300 psig

| | Polymer Treatment | Molecular weight | Boiler Balances (ppm) P-Alk | SiO$_2$ | Deposit (g/ft$^2$) Upper | Lower | Total |
|---|---|---|---|---|---|---|---|
| 1. | PAA * (commercial) | less than 5,000 | 188 | 30 | 1.10 | 1.36 | 2.46 |
| 2. | PMA ** (commercial) | 7,000 | 190 | 25 | 0.38 | 0.77 | 1.15 |
| 3. | AA/HPA (2:1) | 6,000 | 182 | 29 | 0.31 | 0.59 | 0.90 |
| 4. | PAA * (commercial) | less than 5,000 | 198 | 47 | 0.40 | 0.40 | 0.80 |
| 5. | AA/HPA (3:1) | 10,000 | 216 | 50 | 0.20 | 0.36 | 0.56 |
| 6. | PMA ** (commercial) | 7,000 | 218 | 28 | 0.32 | 0.53 | 0.85 |

\* PAA - Polyacrylic acid
\*\* PMA - Polymethacrylate
Test Conditions: As in Table II - Boiler No. 2

Again, the data established that the acrylic acid-hydroxy propyl acrylate polymers operated effectively as calcium phosphate and magnesium silicate deposit control agents.

Iron Oxide Deposition

The experimental boilers were also utilized to evaluate the capacity of the polymers of the instant invention to disperse iron oxide. Basically the same test procewater systems such as cooling water systems where the concentration of calcium ions and phosphate ions are such as to provide a calcium phosphate scale prone system.

The evaluations were conducted utilizing solutions respectively containing calcium ion and ortho-phosphate ion. After mixing the two solutions and the specified equilibration time, residual phosphate ion measurements were made after the mixture had been filtered. High residual phosphate ion concentration indicated good inhibition.

The specifics of the test procedure are as follows: Conditions of Test: Static; T=70° C, pH=8.5 unless otherwise stipulated; equilibration time — 17 hours; concentration of $Ca^{++}$ as $CaCO_3 = 250$ ppm concentration of $PO_3^{-3} = 6.0$ ppm; treatment dosage = 10 ppm.

Solutions: (1) prepare solution of 0.4482g. of $Na_2HPO_4$ per liter DI water (2) prepare solution of 36.76g. $CaCl_2 \cdot 2H_2O$ per liter DI water (3) to 1800 ml DI water, add 20 ml solution (2), followed by 2 drops conc. HCl. Then add 40 ml solution (1) and bring volume to 2000 ml with DI water.

Method: Place 100 ml aliquot of solution (3) in clean 4 oz. glass bottle. Add 1 ml of 0.1% treatment solution and adjust pH to 8.5 using NaOH. Place bottle in water bath set to 70° C and allow to equilibrate 17 hours.

Analysis: Filtration — remove sample from water bath, filter through $0.2\mu$ millipore filter. Allow filtrate to cool to room temperature and analyze for $PO_4^{-3}$ using Leitz Photometer.

Treatment was added to phosphate solution before mixing. The results of the test were as follows:

TABLE IV

| Polymer Treatment | Ratio of AA to 2-HPA or HEA* | Molecular Weight | Dosage | % Inhibition Calcium Phosphate pH=6.8 | pH=7.0 | pH=8.5 |
|---|---|---|---|---|---|---|
| 1. AA/HPA | 2:1 | 9,000 | 10 | NP** | 98.3 | 95.8 |
| 2. AA/HPA | 2:1 | 6,000 | 10 | NP** | 93.2 | 95.8 |
| 3. AA/HPA | 3:1 | 10,000 | 10 | NP** | 95.7 | 95.8 |
| 4. PAA | — | <5,000 | 10 | NP** | NP** | 14.4 |
| 5. PAA | — | <5,000 | 10 | NP** | NP** | 16.9 |
| Additional Testing: | | | | | | |
| 6. AA/HPA | 3:1 | 10,000 | 10 | 95.4 | 99.1 | 94.9 |
| 7. AA/HPA | 2:1 | 9,000 | 10 | 99.0 | 100.0 | 92.4 |
| 8. AA/HPA | 2:1 | 6,000 | 10 | 97.2 | 97.3 | 96.6 |
| 9. AA/HPA | 3:1 | 150,000 | 10 | 100.0 | 95.6 | 98.3 |
| 10. AA/HPA | 2:1 | 6,000 | 2.5 | 41.4 | 84.3*** | 32.4 |
| 11. AA/HPA | 3:1 | 2,000 | 5 | 80.7 | NP** | 59.0 |
| 12. AA/HPA | 3:1 | 2,000 | 10 | 97.3 | NP** | 95.7 |
| 13. AA/HPA | 11:1 | 2,000–6,000 | 5 | 84.0 | NP** | 26.5 |
| 14. AA/HPA | 11:1 | 2,000–6,000 | 10 | 97.3 | NP** | 97.4 |
| 15. AA/HEA | 1.6:1 | 2,000–6,000 | 5 | 88.2 | NP** | 55.5 |
| 16. AA/HEA | 1.6:1 | 2,000–6,000 | 10 | 97.3 | NP** | 99.1 |
| 17. AA/HEA | 1:1 | 2,000–6,000 | 5 | 90.7 | NP** | 51.3 |
| 18. AA/HEA | 1:1 | 2,000–6,000 | 10 | 97.3 | NP** | 99.1 |
| 19. AA/HPA | 2:1 | 2,000 | 5 | 84.9 | NP** | 63.8 |
| 20. AA/HPA | 2:1 | 2,000 | 10 | 95.8 | NP** | 96.5 |
| 21. AA/HPA | 5.5:1 | 1,000–2,000 | 5 | 80.7 | NP** | 49.1 |
| 22. AA/HPA | 5.5:1 | 1,000–2,000 | 10 | 100.0 | NP** | 94.8 |
| 23. AA/HPA | 5.5:1 | 6,000–10,000 | 5 | 79.8 | NP** | 56.9 |
| 24. AA/HPA | 5.5:1 | 6,000–10,000 | 10 | 100.0 | NP** | 97.4 |

*Hydroxy ethyl acrylate
**NP - Not performed
***Test conducted at 100 pm Ca as $CaCO_3$ It is apparent that the polymers of the invention were quite effective in inhibiting calcium phosphate formation at the varied pH ranges were calcium phosphate formation would be expected under the conditions of the test.

Additional tests were conducted utilizing the test procedure described. Other polymers of different molecular weight were evaluated together with the other commercially available polymers of acrylic acid and methacrylic acid. The results are as follows:

TABLE V

| Polymer Treatment | Mole ratio of AA to 2-HPA | Molecular weight | % Inhibition Calcium Phosphate (Dosage) 5 ppm | 10 ppm |
|---|---|---|---|---|
| AA/HPA | 3:1 | 10,000 | 13.0 | 96.7 |
| AA/HPA | 2:1 | 9,000 | 71.2 | 95.8 |
| AA/HPA | 2:1 | 6,000 | 60.2 | 95.8 |
| AA/HPA | 2:1 | 500,000 | 17.2 | 100.0 |
| AA/HPA | 2:1 | 100,000 | 24.1 | 100.0 |
| AA/HPA | 3:1 | 150,000 | 17.2 | 88.8 |
| PAA * | — | less than 5,000 | 5.1 | 43.2 |
| AA/HPA | 3:1 | 2,000–4,000 | 63.4 | 95.9 |
| PMA ** | — | 7,000 | 20.3 | 27.1 |

* PAA - 100% polyacrylic acid (or water soluble salt thereof)
** PMA - 100% polymethacrylic acid (or water soluble salt thereof)
Test conducted at pH 8.5

The polymers of the invention again proved to be completely effective at the higher dosage range and even acceptable for the most part at the lower range. Feed rates of the polymers are of course dependent upon the calcium and magnesium phosphate and silicate formation potential and the amount of suspended solids in the aqueous medium. In the foregoing series of tests, the lower dosage rates did not prove to be effective because of the high quantity of calcium ions and phosphate ions present in the test solution. With lower concentrations of each, the lower dosage rates would be expected to be effective.

The invention is applicable to any aqueous system where calcium phosphate formation and precipitation is a potential problem. For example, the inventive process would be effective in gas scrubbing systems where scrubbing mediums such as sewage treatment effluents which contain high phosphate levels are used as the scrubbing or washing medium. These systems would have the prerequisite for the formation and deposition of calcium phosphate which is to be avoided. The additional areas of application such as the phosphate production and processing field, fertilizer field, etc., will be apparent to those operating in the areas where calcium phosphate formation and deposition are problems.

In order to establish the efficacy of the polymers of the invention as the dispersants for suspended particulate matter, tests were conducted utilizing respectively iron oxide and clay suspensions as exemplary test mediums.

In accordance with the procedure, a 0.1% iron oxide or clay suspension in deionized water was prepared. The hardness of the slurry was adjusted to 200 ppm $CaCO_3$ and the resultant medium was mixed for a time required to obtain a uniform suspension. The pH was then adjusted to the testing level.

Aliquots of the suspension were drawn off, placed in glass bottles and the appropriate amount of treatment added. The samples were then shaken to insure good mixing of treatment and suspension. Using a turbidimeter or an instrument which measures light transmission, the effect of the treatment compared to a control (suspension to which no treatment was added) was measured. Treatments causing an increase in turbidity or a decrease in light transmitted are considered dispersants. The results determined were as follows.

TABLE VI

Dispersant Characteristics of Acrylic acid-2-Hydroxy Propyl Acrylate Polymer

| Polymer Treatment | Mole Ratio of AA to HPA | Molecular Weight | Dosage | % Iron Oxide Dispersion | % Clay Dispersion |
|---|---|---|---|---|---|
| 1. AA/HPA | 2:1 | 9,000 | 10 | 83.9 | 84.6 |
| 2. AA/HPA | 2:1 | 6,000 | 10 | 88.6 | 79.6 |
| 3. AA/HPA | 3:1 | 10,000 | 10 | 83.2 | 84.7 |
| 4. PAA * | — | 1,000 | 10 | 45.0 | 68.0 |
| 5. AA/HPA | 2:1 | 500,000 | 10 | 41.3 | 30.1 |
| 6. AA/HPA | 2:1 | 100,000 | 10 | 46.9 | 43.9 |
| 7. AA/HPA | 3:1 | 150,000 | 10 | 46.7 | 37.7 |
| 8. AA/HPA | 3:1 | 60,000 | 10 | 45.7 | 41.0 |
| 9. PAA* | — | 100,000 | 10 | 12.0 | 20.0 |

* Polyacrylic acid

It is apparent from the above data that the inventive polymers were quite effective in dispersing particulate matter exemplified by iron oxide and clay. Accordingly, it was concluded that the polymers of the invention have utility in aqueous systems where deposition problems are a potential. It is also apparent that the polymers of the invention would be of particular interest in operations such as recirculating and once-through cooling systems where calcium and magnesium phosphate and silicate scale formation is prevalent and where additional problems due to deposition of suspended matter such as iron oxide, silts and clays are encountered. Since scrubber systems have problems common with cooling water systems, this application is also suitable to use of the invention.

We claim:

1. A method of controlling the deposition of scale imparting precipitates on the structural parts of a system exposed to an aqueous medium containing scale imparting precipitates under deposit forming conditions; said scale imparting precipitates being selected from the group consisting of calcium phosphate, magnesium phosphate, calcium silicate, magnesium silicate, iron oxide and mixtures thereof, which method comprises adding to said aqueous medium an effective amount for the purpose of a water soluble polymer comprising moieties derived from an acrylic acid or water soluble salt thereof and moieties of an hydroxylated lower alkyl acrylate, wherein the moieties of the polymer have the following formulas:

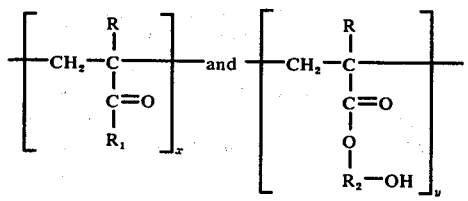

wherein R is hydrogen or a lower alkyl of from 1 to 3 carbon atoms; $R_1$ is OH, OM or $NH_2$ where M is a water soluble cation; $R_2$ is a lower alkyl of from about 2 to 6 carbon atoms and the mole ratio of x:y is 34:1 to 1:4.

2. A method according to claim 1, wherein the polymer has a molecular weight of from about 500 to 1,000,000 and is added in an amount of from about 0.1 to 500 parts per million parts of aqueous medium.

3. A method according to claim 2, wherein the system is a steam generating system.

4. A method according to claim 2, wherein the polymer is a copolymer of acrylic acid or water soluble salt thereof and 2-hydroxypropyl acrylate or hydroxyethyl acrylate.

5. A method according to claim 4, wherein the mole ratio of acrylic acid or water soluble salt thereof to the acrylate is from about 11:1 to 1:2.

6. A method according to claim 5, wherein the system is a steam generating system.

7. A method of dispersing and maintaining dispersed particulate matter in a system having an aqueous medium which contains particulate matter selected from the group consisting of clay, iron oxide and mixtures thereof, which method comprises adding to the aqueous medium an effective amount for the purpose of a water soluble polymer comprising moieties derived from an acrylic acid or water soluble salt thereof and moieties of an hydroxylated lower alkyl acrylate, wherein the moieties of the polymer have the following formulas:

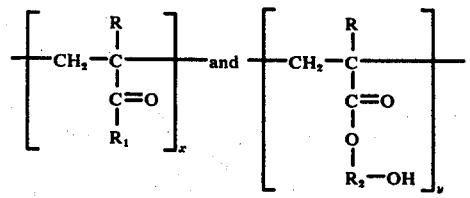

wherein R is hydrogen or a lower alkyl of from 1 to 3 carbon atoms; $R_1$ is OH, OM or $NH_2$ where M is a water soluble cation; $R_2$ is a lower alkyl of from about 2 to 6 carbon atoms and the mole ratio of x:y is 34;1 1 to 1:4.

8. A method according to claim 7, wherein the polymer has a molecular weight of from about 500 to 1,000,000 and is added in an amount of from about 0.1 to 500 parts per million parts of aqueous medium.

9. A method according to claim 8, wherein the polymer is a copolymer of acrylic acid or water soluble salt thereof and 2-hydroxypropyl acrylate or hydroxyethyl acrylate.

10. A method according to claim 9, wherein the mole ratio of acrylic acid or water soluble salt thereof to the acrylate is from about 11:1 to 1:2.

11. A method according to claim 10, wherein the system is a cooling water system.

12. A method according to claim 10, wherein the system is a scrubber system.

13. A method according to claim 8, wherein the system is a cooling water system.

14. A method according to claim 8, wherein the system is a scrubber system.

15. A method according to claim 7, wherein the system is a cooling water system.

16. A method according to claim 7, wherein the system is a scrubber system.

17. A method of inhibiting the formation of calcium phosphate in a system which contains an aqueous medium having calcium and phosphate scale forming ions under calcium phosphate forming conditions, which method comprises adding to the aqueous medium an effective amount for the purpose of a water soluble polymer comprising moieties derived from an acrylic acid or water soluble salt thereof and moieties of an hydroxylated lower alkyl acrylate, wherein the moieties of the polymer have the following formulas:

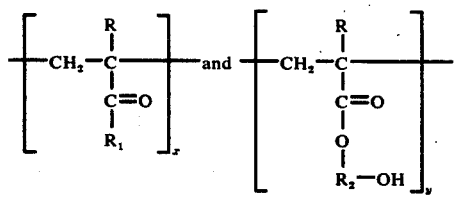

wherein R is hydrogen or a lower alkyl of from 1 to 3 carbon atoms; $R_1$ is OH, OM or $NH_2$ where M is a water soluble cation; $R_2$ is a lower alkyl of from about 2 to 6 carbon atoms and the mole ration of x:y is 34:1 to 1:4.

18. A method according to claim 17, wherein the polymer has a molecular weight of from about 500 to 1,000,000 and is added in an amount of from about 0.1 to 500 parts per million parts of aqueous medium.

19. A method according to claim 18, wherein the system is a cooling water system.

20. A method according to claim 19, wherein the phosphate ions have been added to the aqueous medium as a treatment.

21. A method according to claim 18, wherein the polymer is a copolymer of acrylic acid or water soluble salt thereof and 2-hydroxypropyl acrylate or hydroxyethyl acrylate.

22. A method according to claim 21, wherein the mole ratio of the acrylic acid or water soluble salt thereof to the acrylate is from about 11:1 to 1:2.

23. A method according to claim 22, wherein the system is a cooling water system.

24. A method according to claim 23, wherein the phosphate ions have been added to the aqueous medium as a treatment.

25. A method according to claim 21, wherein the system is a cooling water system.

26. A method according to claim 25, wherein the phosphate ions have been added to the aqueous medium as a treatment.

27. A method according to claim 17, wherein the phosphate ions have been added to the aqueous medium as a treatment.

* * * * *

UNITED STATES PATENT OFFICE
CERTIFICATE OF CORRECTION

Patent No. 4,029,577       Dated June 14, 1977

Inventor(s) Irene T. Godlewski et al

It is certified that error appears in the above-identified patent and that said Letters Patent are hereby corrected as shown below:

Column 1, line 36, after "again." please delete "p"; line 55, please delete "deposite" and substitute therefor -- deposit --.

Column 2, line 65, delete "content" and substitute therefor -- contend --.

Column 3, line 66, please delete "Ca" and substitute therefor --C--.

Column 4, line 20, please delete "5000,000" and substitute therefor -- 500,000 --.

Column 6, line 8, please delete "gms/ft$^2$" and substitute therefor -- g/ft$^2$ --; Table I, last column after "Scale weight" please delete "at K".

Columns 7 and 8, Table II, under Test Conditions, Steam Rate, please delete "30 psig"; Table III, under Boiler Balances (ppm) please delete "SiO$_2$" and substitute therefor --RSiO$_2$ --.

Column 8, approximately line 32, after "Feed water iron concentration 3.2 ppm Fe" please delete "or" and substitute therefor -- as --.

Column 9, line 53, delete "were" and substitute therefor -- where --.

Signed and Sealed this

Twenty-fifth Day of October 1977

[SEAL]

Attest:

RUTH C. MASON       LUTRELLE F. PARKER
*Attesting Officer*      *Acting Commissioner of Patents and Trademarks*